Oct. 15, 1963   W. A. MISH, JR   3,107,018
TOBACCO HARVESTER
Filed Aug. 7, 1961   3 Sheets-Sheet 1

INVENTOR
William A. Mish, Jr.
BY
Herbert M Birch
ATTORNEY

Oct. 15, 1963   W. A. MISH, JR   3,107,018
TOBACCO HARVESTER
Filed Aug. 7, 1961
3 Sheets-Sheet 2
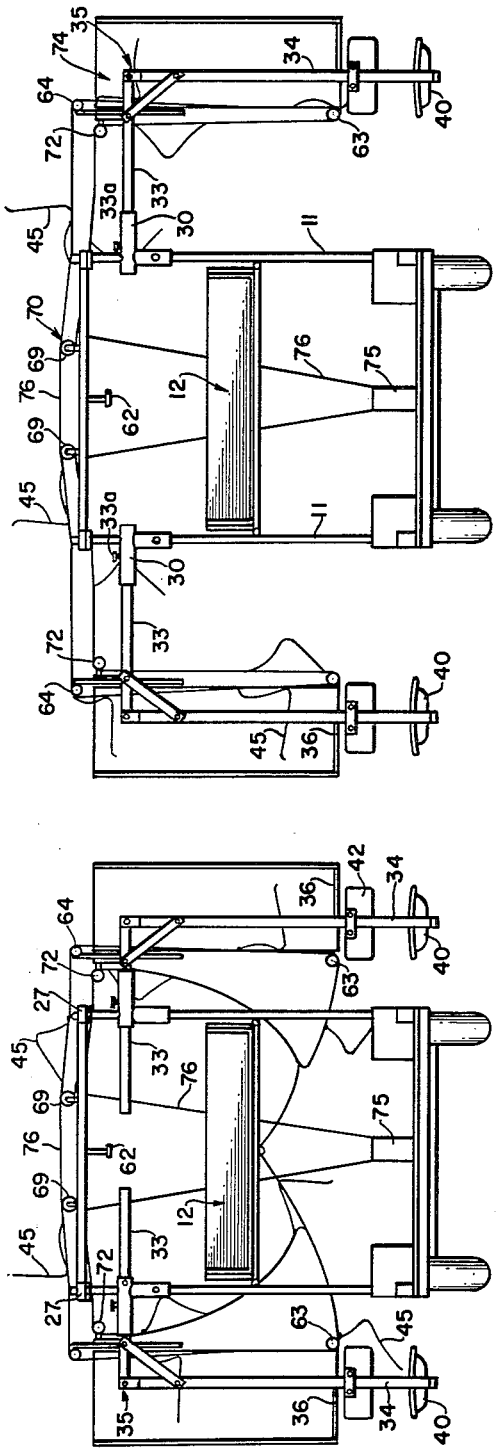
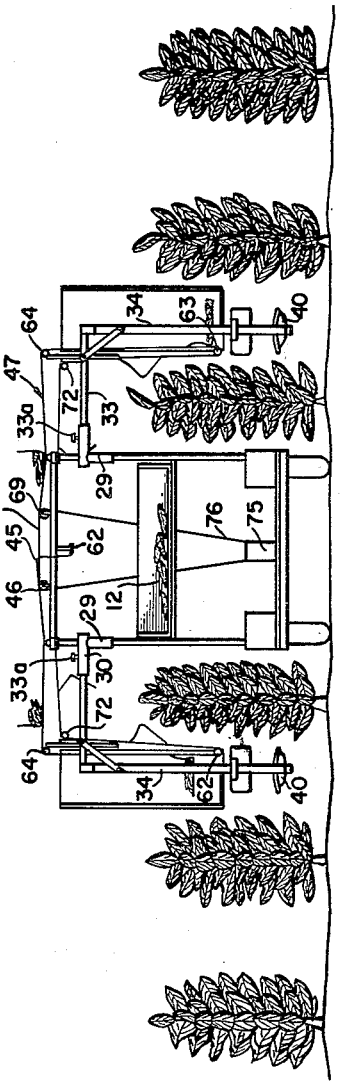
INVENTOR
William A. Mish, Jr.
BY
*Herbert M Birch*
ATTORNEY

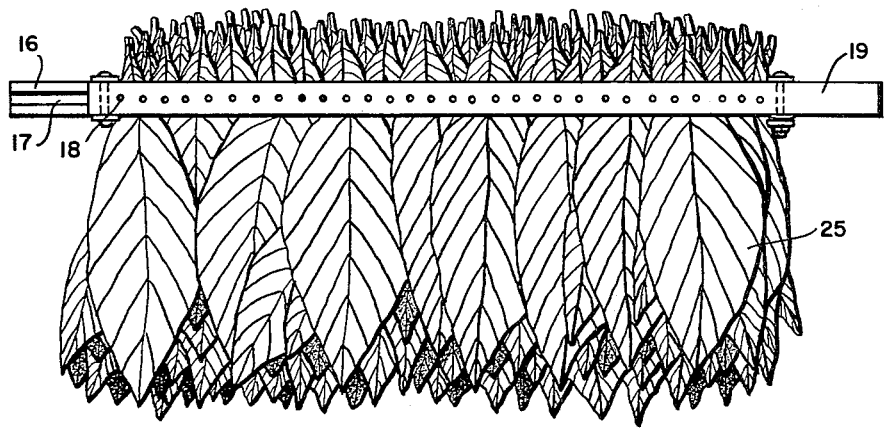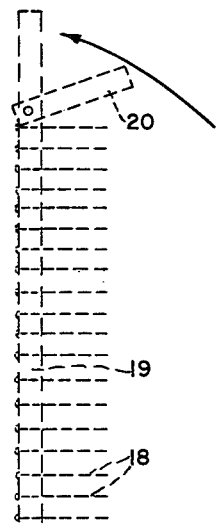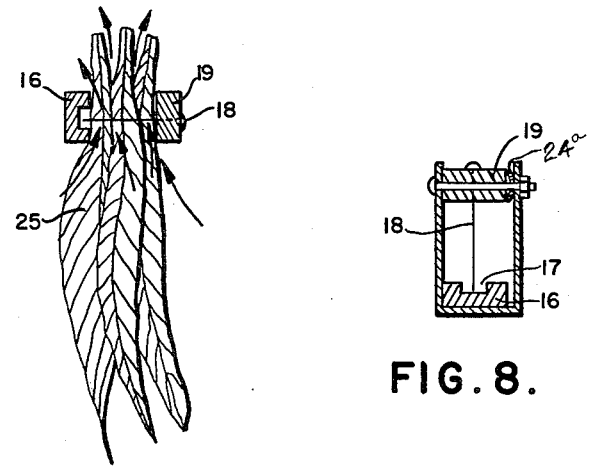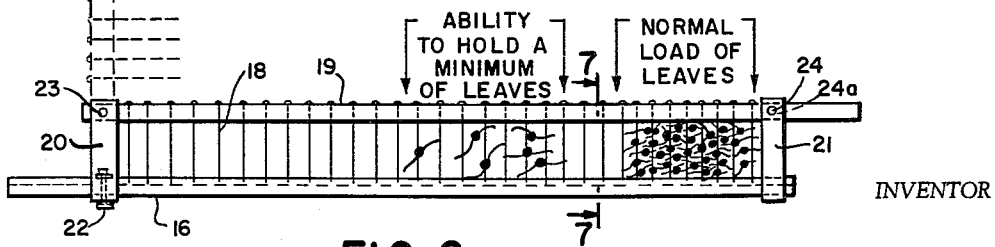

United States Patent Office 3,107,018
Patented Oct. 15, 1963

3,107,018
TOBACCO HARVESTER
William A. Mish, Jr., P.O. Box 264, Washington, N.C.
Filed Aug. 7, 1961, Ser. No. 129,706
6 Claims. (Cl. 214—83.1)

This invention relates to the harvesting of growing crops including the handling and transportation of such crops and to apparatus or equipment by which such harvesting, handling and transporting of the crops from growing positions in the field and to a particular station or location is accomplished.

The invention relates particularly to a tobacco harvester or vehicle movable between rows of growing tobacco in a field, said harvester having seat means whereby workmen may be carried forward between the rows to select and detach the prime or ripe leaves from the spaced rows of tobacco plants on opposite sides of the body of the vehicle, said workers placing the selected ripe leaves on conveyors, which carry the ripe leaves upwardly and horizontally over intervening rows to a table above the floor of the vehicle where they can be attached to sticks and placed on the floor of the harvester for subsequent curing.

The harvesting of tobacco has been a problem due to the time and labor involved and the correlation of the harvesting, transporting, and curing of the tobacco and efforts have been made to reduce the expense to make growing of the crop more profitable by saving time and labor. Heretofore, tobacco harvesters have been made in which the workmen, referred to as leaf pickers or primers, have ridden on the vehicles and gathered leaves as they were conveyed along the rows of tobacco. These prior machines have been lacking in various respects including a quick and easy way of holding and carrying the leaves as well as attaching the leaves to sticks and the carrying of the sticks where they can be easily reached from the side of the harvester.

It is an object of the invention to provide a tobacco harvester which can be propelled between rows of growing tobacco and which has a readily accessible load bearing platform for collecting the picked ripe tobacco near the ground, a table or central station above the same, and supports for carrying workmen spaced from the sides of the table and with conveyors leading from each workman support for conveying the leaves of tobacco picked by the workmen onto the table.

Another object of the invention is to provide a tobacco harvester with a low platform and transverse conveyor means which will require minimum attention in carrying tobacco to a table or central station on said platform and in the securing, other than by twine, of the tobacco to sticks for handling, with a supply of unloaded sticks available beneath the table and on which loaded sticks may be stored for easy removal by workmen on the ground.

Another object of the invention is to provide a tobacco stick of two bars or sticks pivoted together at one end and a loop fastener for securing the unpivoted ends together, one of said bars having a groove or channel and the other having spaced spikes or projections which enter the groove or channel in the contiguous bar, and which spikes can be placed with the two bars spaced apart and with one of the bars at the edge of the table in a position to have leaves of tobacco dragged thereover, whereby the leaves may be pierced by the spikes on the other bar and when said bars are brought together.

Another object of the invention is to provide a tobacco harvester which will expedite harvesting and attaching tobacco leaves securely by their upper broad leaf portion onto tobacco sticks of a novel type, whereby the tobacco may be further efficiently handled with minimum number of workmen and reduction in time, attention, and expense.

Other objects and advantages will be apparent from the following description and the accompanying drawings wherein:

FIGURE 1a is a view of the discharge end of the conveyor;

FIGURE 2 is a rear view of the tobacco harvester apparatus with the machine harvester seat supports retracted for highway travel between harvesting locations;

FIGURE 3 is a view like FIGURE 2, but showing the seat supports extended to accommodate the growing crop row widths;

FIGURE 4 is a rear view of the apparatus as it appears in position with respect to crops to be harvested;

FIGURE 5 is a side view of a tobacco curing stick illustrating the securing of the leaf tobacco therein by the upper broad portion of the leaf;

FIGURE 6 is an elevation view of the tobacco stick showing the pivoted member for holding the stick bars together;

FIGURE 7 is a section view taken on line 7—7 of FIGURE 6 of the tobacco stick closed with a collection of tobacco leaves therein for curing, but showing the same held at the stem end of the leaves; and FIGURE 8 is a section taken on the line 8—8 of FIGURE 6.

Figures 1, 1A:
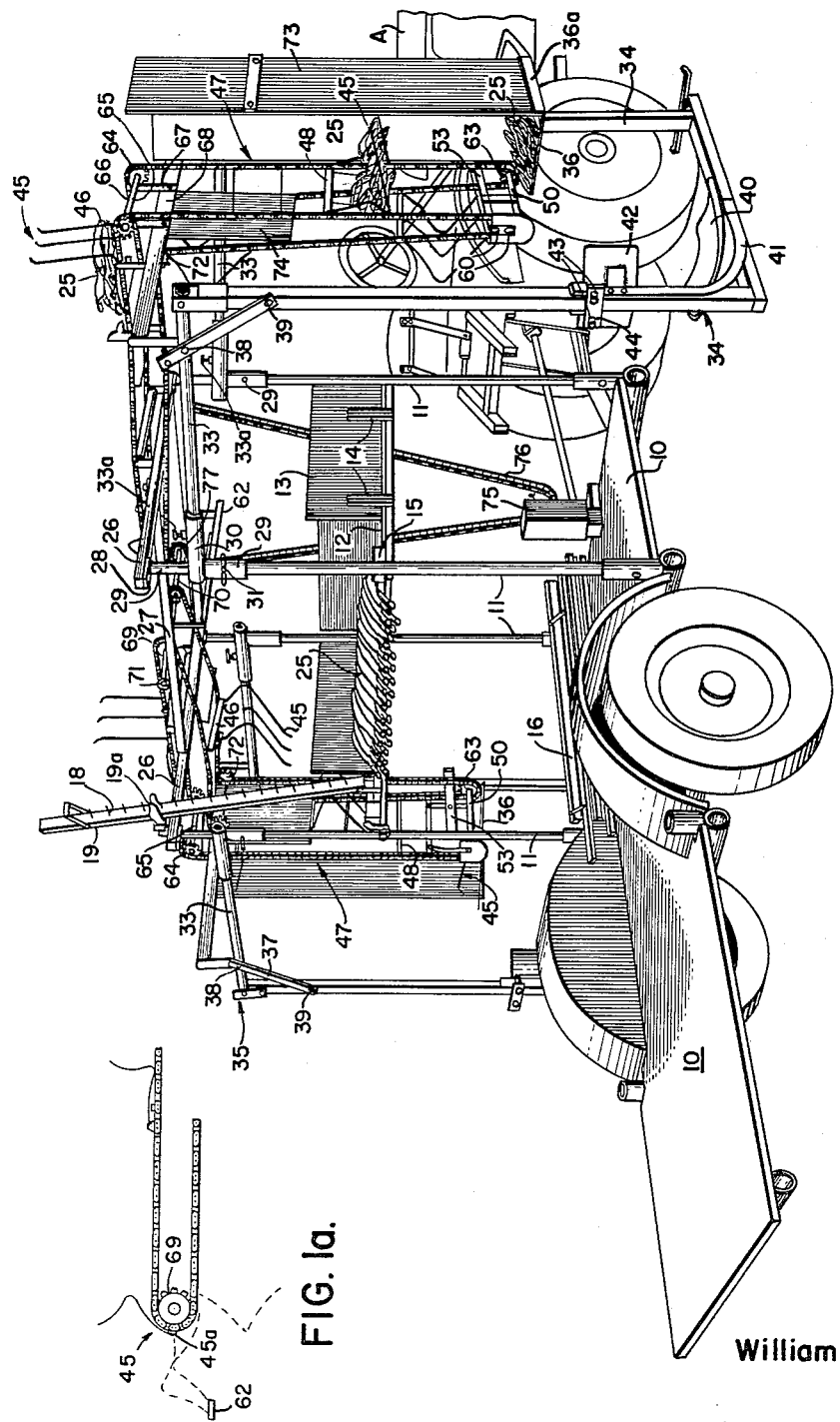
FIGURE 1 is a perspective illustrating one application of the invention.
FIG. 1a is a view of the discharge end of the conveyor.

The invention to be hereinafter described in detail by reference characters is a tobacco harvester adapted to be drawn as a trailer by a tractor or other means. This harvester includes a low bed or platform on a wheel supported axle approximately midway of its length for balance, and on the front portion of which bed empty sticks are adapted to be carried beneath a table or central station on which tobacco leaves are conveyed and deposited from pickers riding on the machine on seats between the rows of growing tobacco at the sides thereof. The rear portion of the bed or platform is adapted to have piled thereon sticks with tobacco clamped therebetween for ready access and removal by other workmen not on the machine, each tobacco stick being composed of a pair of bars pivoted together at one end, one bar having a longitudinal channel or groove and the other having spaced spikes adapted to pierce predetermined portions of the leaves therebetween when they are dragged thereon and the bars moved together from spaced relation.

Referring to the drawings and first with particular reference to FIGURE 1, a tobacco harvester is provided which can be attached to and drawn by a tractor or other means A. The harvester includes a low trailer platform or bed 10 with four uprights or posts 11, two at each side, on which is mounted for ready access to a workman a table or central station 12 onto which tobacco is adapted to be deposited and from which it can be readily removed by a workman.

The table may have retaining sides 13 held by posts 14 at the sides and rear of the table, the front of the table being open and having a retainer 15 at each end of said open edge into which the opposite end of a tobacco stick bar 16 is adapted to be received, such tobacco stick bar having a groove 17 for receiving spaced spikes 18 on a complementary tobacco stick bar 19. The two tobacco stick bars 16 and 19 are connected by means of a pair of U-shaped clamps 20 and 21, U-shaped clamp 20 being fastened to the bar 16 by means of a bolt 22 and being fastened to the bar 19 by means of a pivot pin 23. The U-clamp 21 is fastened to the bar 19 by a pivot pin 24 and is allowed to swing on such pivot pin to a position to retain the bars in parallel relation or to swing off the end of the bar 16 to permit the bar 19 to be swung on its pivot pin 23. A spring type flat washer 24a may be provided to frictionally hold the clamp to any position. At the edge of the table the bar 16 is in the lower position on the retaining members 15 with the bar 19 in elevated position and clamped into such upright position by a spring retainer clip 19a on side cross bar 26, see FIGURE 1. Tobacco leaves 25 deposited on the table are dragged to a position so that their stems overlie such lower bar 16 filling the space along such lower bar, then the upper bar is swung downwardly into a parallel position and U-clamp 21 is swung over the end of the bars to hold the two bars which form the stick, whereon the sticks are placed on the lower end of the platform or bed 10. A supply of sticks for use may readily be carried beneath the table on the front of the bed, see FIGURES 1, 6, 7 and 8.

Tobacco is deposited on the table or central station by a mechanism after it is picked by workmen at the sides of the vehicle. In order to accomplish this, upon the posts 11 is mounted a top frame formed of parallel side members 26 and cross parallel members 27. The cross members are at right angles to the side members and the front cross member connects the corresponding ends of the side members, while the second cross member is spaced intermediate the ends of the side members. The side members have attached by bolts 28 adjacent each extremity one end of the top portion 29 of a T-shaped member with such top portion in vertical position and the generally upright post 30 of such T-shaped member in horizontal position, with the lower end of the top of the T-shaped member in the form of a hollow sleeve in each of which a post 11 is removably retained by means of a set screw 31. The post portion of the T-shaped member is disposed substantially at right angles to the side member 26 and is adapted to receive therein horizontally extending supporting bars 33. These bars 33 telescope in the part 30 and are held to different extended portions by set screws 33a to make adjustments for different rows, see FIGURE 3, and also to make the machine narrower for highway travel, see FIGURE 2. The respective outer ends of the respective bars 33 are connected to a U-shaped frame 34 at the lower portion thereof by means of bolts 35, the U-shaped frame being provided with braces 37 fastened by bolts 38 and 39 to the bars 33 and the U-shaped frame 34, respectively.

In the lower portion of the U-shaped frame 34 is a seat 40 on a support 41 on which also is disposed a back rest 42, the back rest being fastened by bolts 43 and a bar 44 to the frame 34. A workman riding on the seat gathers from one to six leaves from each stalk of tobacco as he travels slowly between the rows of tobacco and he places the leaves horizontally by the handful on fixed horizontal spaced rods 36 supported on a bracket bar 36a above the worker's seat 40, which the arms of a leaf cradle 45 pass between. The cradles 45 comprise three spaced arms, each having three portions of substantially equal length and extending slightly less than ninety degrees in spaced apart relation, each of said bars being mounted on a supporting bar 46 pivoted between a pair of conveyors, such as chains 47. These conveyors or chains 47 are connected by spaced cross bars 48 and they operate so that the conveyors travel as a unit, see FIGURE 1.

A similar shaft 50 mounted on brackets 53 by bolts or other fastening means 60 moves the conveyor in a vertical direction from adjacent a workman's seat and then laterally to a position over the table or central station 12, so that workmen picking the tobacco can place it on the rods 36 to be picked up by the outer ends of the cradle arms which will travel with the cradle arms substantially horizontal, until the cradle reaches its highest point and starts laterally in a horizontal direction, whereupon the weight of the tobacco will shift to the remaining portion of the cradle, until the limit of horizontal travel is reached and the cradle rotates around the end of the travel of the conveyor so that the tobacco will fall by gravity from the cradle and the free ends of the cradle will strike a stop bar 62 giving a leaf time to fall by gravity from the cradle before the cradle moves from the stop bar. For example, as shown in FIGURE 1a at the point of contact of the arms of a leaf cradle 45 with the stop bar 62, the ends of the arms rest on the stop bar until the sprocket 69 reeves the pivot point 45a of the leaf cradle 45 far enough to slide the arm ends off of the rest position thereof on the stop bar. The leaf cradle continues on its path and during its downward movement it swings against the spaced chain bars 48 traveling along the lower run of the horizontal portion of the conveyor, down the inner run of the vertical portion and into a horizontal position adjacent the workman for receiving additional tobacco from the fixed rods 36.

The conveyor 47 from each respective worker's seat 40 reeves around spaced sprockets 63 mounted on the said respective rotatable shafts 50. Each pair of sprockets 63 on the shaft 50 is rotatably mounted in the brackets 53 at each side of a respective U-frame 34; the conveyor 47 thence reeves around intermediate sprockets 64 keyed to an intermediate rotatable shaft 65, which is supported to rotate in a horizontal support 66 secured by a pair of spaced brackets 67 attached to a support bar 68 connected to support bars 33; thence the conveyor reeves around spaced sprockets 69 on a shaft 70 supported for rotation by brackets 71 on cross members 27, and then returns around idler sprockets 72 mounted on the opposite side of support bar 68 with respect to the spaced brackets 67 to the spaced sprockets 63 at the worker's seat.

In order to protect the tobacco growing in the field a guard 73 is provided attached to one side of the workman's frame 34 and a flat guard 74 is fastened to the auxiliary support which carries the intermediate shafts and sprockets.

The conveyors 47 at each side of the harvester are driven in unison by a power take-off chain drive comprising a reduction gear drive 75 and sprocket for a drive chain 76, which loops triangularly over drive sprockets 77 on each sprocket shaft 70 rotatable on the cross members 27.

When the ripe tobacco leaves picked up from fixed leaf loading rods 36 drop from the cradles 45 to the table collector 12, a workman standing on the platform 10 of the vehicle, moves the tobacco from the collector table and drags leaves 25 by the handfuls so that their stems are resting about three inches across and beyond the lower tobacco stick bar or member 16. When the stick member 16 is thus loaded with leaves, for example one hundred to three hundred depending on size, the spike carrying stick member 19 is lowered against the member 16 so that the spikes penetrate the leaves at their respective butt portions and rest in the channels of the cooperating stick member 16. The tobacco clamp or stick means including the members 16 and 19 is then manually raised and the bail or loop fastener 21 swings to position around the end of the opposite member of the stick to keep the two members together. The tobacco loaded stick with the stems up is now placed across the end of the trailer and an empty stick is withdrawn from a position in the front lengthwise of the trailer and is placed in the retainers 15 at the rear corner edges of the table 12 for the next filling.

Thus, there is provided a novel arrangement for harvesting growing crops, such as tobacco, whereby the same may be picked, conveyed to a handling station and mounted on curing sticks or the like for curing whereby a great saving in time and labor with greater economy than heretofore results.

Without further description it is believed that the present invention is clearly understandable. While only one embodiment of the invention is described and illustrated in detail, it is to be expressly understood that other combinations, modification and arrangements of the parts which will now occur to others skilled in the art are to be considered a part hereof. To determine the scope of the present invention reference should be had to the appended claims.

What is claimed is:

1. A tobacco harvester comprising an elongated mobile platform having a front end and a rear end, an upstanding frame structure supported on said front end, a table supported in said frame structure intermediate the said frame, laterally extending support means having longitudinally and horizontally spaced apart free ends from each side of the frame structure, a U-shaped frame depending downwardly from the spaced free ends, said frame having the legs thereof aligned in the direction of travel of said mobile platform, said U-shaped frame supporting a seat for a worker, whereby said seat traverses the field between spaced rows of growing crops to be picked, a fixed pick-up station in front of each seat at chest level of an occupant of the seat, endless conveyor means including spaced tobacco leaf-pick-up cradles, said cradles co-acting with said fixed pick-up station to pick-up the workmen harvested tobacco and convey the same to said table, and cradle stop means mounted in said upstanding frame structure above said table, whereby said cradle is stopped momentarily during each tobacco leaf dumping operation.

2. A tobacco harvester comprising an elongated mobile platform having a front end and a rear end, an upstanding frame structure supported on said front end, a table supported in said frame structure intermediate the said frame, laterally extending support means having longitudinally and horizontally spaced apart free ends from each side of the frame structure, a U-shaped frame depending downwardly from the spaced free ends, said frame having the legs thereof aligned in the direction of travel of said mobile platform, said U-shaped frame supporting a seat for a worker, whereby said seat traverses the field between spaced rows of growing crops to be picked, a fixed pick-up station in front of each seat at chest level of an occupant of the seat, endless conveyor means including spaced tobacco leaf pick-up cradles, said cradles co-acting with said fixed pick-up station to pick-up the workmen harvested tobacco and convey the same to said table, and a compound tobacco stick supporting means mounted at each corner of said table, whereby the picked tobacco leaves on said table may be manually positioned and clamped in said compound tobacco stick comprised of two bar members pivoted together.

3. The tobacco harvester described in claim 2, wherein said tobacco stick bar members are pivoted together and include a retainer means at one end to hold the same together.

4. Means for harvesting leafy growing crops planted in rows comprising a central wheel supported platform, a framework supported on the platform, said framework having laterally extending portions, said portions supporting U-frames, a workman seat mounted in each of the U-frames, said U-frames being positioned to move abreast between the rows of growing crops within crop picking reach of the workman on each seat, a crop loading station, a collector table supported in the said framework above the platform, and self-loading and unloading conveyor means having the self-loading end adjacent a workman seat and co-acting with said crop loading station and the unloading end adjacently above the said collector table, said self-loading end comprising spaced support bars at approximately the chest level of a workman on an adjacent seat, and a vertically extending elongated guard means adjacent said loading end.

5. Means for harvesting leaf growing crops planted in rows comprising a central wheel supported platform, a framework supported on the platform, said framework having laterally extending portions, said portions supporting U-frames, a workman seat mounted in each of the U-frames, said U-frames being positioned to move abreast between the rows of growing crops within crop picking reach of the workman on each seat, a crop loading station, a collector table supported in the said framework above the platform, self-loading and unloading conveyor means having the self-loading end adjacent a workman seat and co-acting with said crop loading station, the unloading end adjacently above the said collector table, and means for driving said conveyors in substantial unison comprising a single power take-off sprocket and a drive chain looped around at least one driven sprocket of each of said conveyor means, said self-loading end comprising spaced support bars at approximately the chest level of a workman on an adjacent seat, and a vertically extending elongated guard means adjacent said loading end.

6. Means for harvesting leaf growing crops planted in rows as described in claim 5, wherein said laterally extending portions are telescopically adjustable to make the same framework narrower for highway travel and for adjusting the same to accommodate the row width of crops to be harvested.

References Cited in the file of this patent

UNITED STATES PATENTS

| | | |
|---|---|---|
| 1,275,781 | Stark et al. | Aug. 13, 1918 |
| 1,335,228 | Eshleman | Mar. 30, 1920 |
| 2,230,139 | Gustin | Jan. 28, 1941 |
| 2,378,847 | Harris | June 19, 1945 |
| 2,526,583 | Schlessman | Oct. 17, 1950 |
| 2,702,134 | Alphin | Feb. 15, 1955 |
| 2,704,158 | Long | Mar. 15, 1955 |
| 2,788,141 | Hendrix | Apr. 9, 1957 |
| 2,808,283 | Vickers | Oct. 1, 1957 |
| 2,809,068 | Aranda | Oct. 8, 1957 |
| 2,933,206 | Alphin | Apr. 19, 1960 |